July 7, 1964   G. J. GOEPFERT ETAL   3,140,321
PREPARATION OF GRIGNARD REAGENTS IN
PREDOMINANTLY HYDROCARBON MEDIA
Filed Feb. 16, 1960
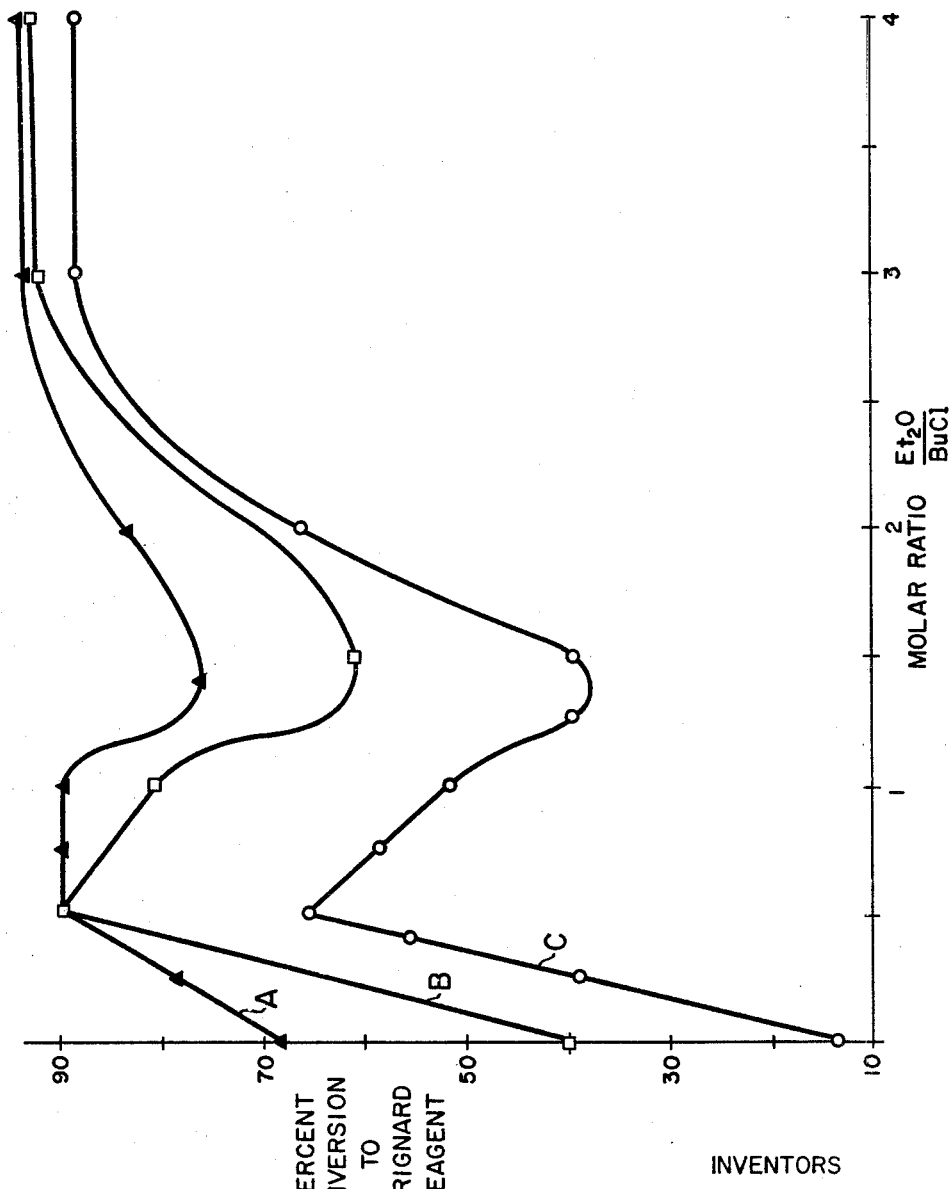
INVENTORS
FRANCIS J. BUESCHER
GEORGE J. GOEPFERT,
ALFRED H. FRYE and
BY VICTOR G. SOUKUP
ATTORNEYS United States Patent Office 3,140,321
Patented July 7, 1964

3,140,321
PREPARATION OF GRIGNARD REAGENTS IN PREDOMINANTLY HYDROCARBON MEDIA
George J. Goepfert and Alfred H. Frye, Cincinnati, Victor G. Soukup, Wyoming, Cincinnati, and Francis J. Buescher, Cincinnati, Ohio, assignors to The Cincinnati Milling Machine Co., Cincinnati, Ohio, a corporation of Ohio
Filed Feb. 16, 1960, Ser. No. 9,033
10 Claims. (Cl. 260—665)

This invention relates to the preparation of Grignard reagents in predominantly hydrocarbon media, and more particularly to the use of a special type of plastically deformed magnesium chip.

The conventional method of preparing a Grignard reagent is to allow metallic magnesium to react with an ethereal solution of the organic halide. A general procedure is given by Rochow et al., "The Chemistry of Organometallic Compounds," John Wiley & Sons, Inc. (1957), page 86. According to this procedure the calculated amount of magnesium turnings (fresh or stored out of contact with moisture), plus a 10% excess is added to the reaction flask and barely covered with dried ether. A small amount of the organic halide is then added so as to form a concentrated solution on the bottom of the flask. For a period of time, referred to as the "induction period," no substantial reaction is evident but once the reaction starts, it spreads and the entire mixture begins to boil vigorously. When the reaction is started, a solution of the halide in ether is run into the reaction mixture at such a rate as to maintain reflux. Reflux is continued by heating for some time after the reaction appears to be over to insure complete utilization of the halide.

The Grignard reagent is usually represented by the simple formula RMgX, where R represents the organic radical, Mg stands for magnesium and X represents the halide radical. Whereas the conventional formula RMgX is useful in stoichiometric equations, it should be understood that Grignard reagents do not necessarily conform to this formula. Grignard reagents are non-volatile, infusible solids, relatively insoluble in hydrocarbons. When the Grignard reagent is formed in diethylether it apparently exists as an etherate, one of the principal etherates being the dietherate $RMgX \cdot 2Et_2O$, where R, Mg and X have the aforementioned significance and $Et_2O$ represents diethylether.

The use of diethylether in the preparation of Grignard reagents, while heretofore considered essential for the preparation of most Grignard reagents in suitable yield, is from many points of view undesirable because of the costliness, volatility and flammability of the diethylether. The same remarks hold true for tetrahydrofuran which has been used more recently for making certain Grignard reagents.

One of the objects of the present invention is to provide a new and improved process for the preparation of Grignard reagents which does not require the use of large volumes of costly, highly volatile flammable solvents, such as diethylether.

A further object of the invention is to provide a method of preparing Grignard reagents which is safer and more practical on a commercial scale than the methods heretofore employed.

Another object of the invention is to provide a process for the preparation of Grignard reagents in an exclusively hydrocarbon medium.

Still a further object of the invention is to provide magnesium in a special form which is particularly suited for the preparation of Grignard reagents in a predominantly hydrocarbon medium.

An additional object of the invention is to provide new and improved magnesium chips suitable for making Grignard reagents, said chips being characterized by the fact that they can be compacted at low orders of pressure into pellets or briquettes which can be used with advantage to produce Grignard reagents.

Another object of the invention is to provide compacted pellets or briquettes of magnesium chips which facilitate charging the magnesium into the reactor and thus permit the use of smaller sized equipment in the preparation of Grignard reagents. Other objects will appear hereinafter.

In accomplishing these objects in accordance with the invention it has been found that Grignard reagents can be prepared in a hydrocarbon medium at atmospheric pressures by using a special magnesium chip that has been plastically deformed by mechanical cutting and characterized by an average thickness which is usually at least 0.0001 inch but not exceeding 0.005 inch, and preferably within the range of 0.001 inch to 0.003 inch. If minor amounts of additives such as ethers are used in a predominantly hydrocarbon medium the range of thickness can be extended to included chips up to a thickness of 0.0075 inch.

These special magnesium chips can be formed, for example, by milling, turning, or broaching on conventional machines normally used in metal working. Excellent magnesium chips for the purpose of the invention can be produced, for example, by a slab milling operation using either climb cutting or conventional cutting. Another way of preparing suitable magnesium chips is to cut them in an orthogonal turning operation. The cutting operation may be performed either in air or in the presence of an inert liquid or gaseous medium, the resulting chips having the requisite high chemical reactivity. Both physical and chemical methods of examination of the magnesium chips thus cut in air, or in an inert medium and subsequently exposed to air, show that the chips bear an oxide coating. The precise metallographic factors which are responsible at least in part for the high reactivity of the herein described chips toward Grignard formation in hydrocarbon media and which arise from the plastic deformation of the metallic lattice in the cutting process are, however, not clearly understood. The special magnesium chips described herein can also be used for preparing certain Grignard reagents in an excess of the organic halide used to form the Grignard reagent or in other media.

For the purpose of the invention it is not necessary that the chips be freshly prepared. They can be used long after they have been prepared and even after they have been allowed to stand and be exposed to normal atmospheric moisture. The magnesium chips which are available commercially do not have the desired characteristics for the practice of the invention.

In order to provide a definition of the magnesium chips suitable for the practice of the invention and to distinguish them from commercial magnesium chips which are not suitable, a specific type of Grignard reaction was carried out with various types of chips using butyl chloride as the organic halide in heptane containing quantities of diethylether in the range of 0.5 mole to 4 moles of diethylether per mole of butyl chloride. The percent conversion of the butyl chloride to butyl chloride Grignard reagent was plotted against the moles of diethylether. The "percent conversion" as used herein means the percentage of a specified starting material which is converted to a Grignard reagent as assayed by the method of Gilman and which is hereinafter described. The objects of the tests was to provide a way of defining the magnesium chips in terms of the effect of added quantities of diethylether on the percent conversion of butyl chloride to Grignard reagent in a heptane medium, the total volume of the reaction medium being held substantially constant.

The reagents used were as follows:

Butyl chloride _____ 7.62 grams (0.0823 mole).
Magnesium chips _____ 2.00 grams (0.0823 atom).
Diethylether (Na dried) ____ $x$ mls. (0.708$x$/74.1 moles).
Heptane _____ 110−$x$ mls.

The procedure used was as follows:

In a 300 ml. round bottom 3-neck flask fitted with a mechanical stirrer, a reflux condenser, and an immersion thermometer were placed the magnesium chips (2 g.) and the reaction system flushed with prepurified nitrogen until the air contained therein was displaced (3–4 minutes). The butyl chloride (7.62 g.), the diethylether ($x$ mls.), and the heptane were then added, the system closed under a slight positive pressure of nitrogen and the mixture brought to reflux by heating the reaction flask with a Glas-Col heater, the mixture being stirred at approximately 400 revolutions per minute (r.p.m.). The appearance of a foggy condensate in the lower part of the reflux condenser, accompanied by a greyish turbidity in the heptane or a loss of chip-lustre, signalled the reaction to be in progress. (This generally occurred 2–5 minutes after the onset of reflux.) Heating and stirring were continued for 45 minutes, the heating mantle was then dropped and the solution allowed to cool to room temperature. The fitted immersion thermometer, reflux condenser, and mechanical stirred were then removed while a moderately strong stream of nitrogen was passed through the system. Care was taken to wash into the flask with anhydrous ether, any traces of Grignard reagent which might have adhered to those parts.

The reaction mixture containing the ether washings was then transferred to a 250 ml. volumetric flask by means of a small glass syphon tube, sufficient ether being added in successive portions to effect a quantitative transfer, the materials in the process of transfer being constantly blanketed by a stream of dry nitrogen. Sufficient ether was added to the volumetric flask to bring the volume up to the 250 ml. mark, the mixture thoroughly shaken and then allowed to settle until the supernatant solution was entirely clear. Using a nitrogen flushed pipette, a 10 ml. aliquot of the solution was withdrawn and added to 50 mls. of 0.1 N hydrochloric acid contained in a 300 ml. Erlenmeyer flask. The mixture was swirled to insure mixing, two drops of phenolphthalein indicator was added, and the mixture titrated with 0.1 N-sodium hydroxide solution. The entire analysis should be completed within fifteen minutes from the time the reaction is completed. The percent conversion to Grignard agent was calculated by the equation $$\text{Percent conversion} = \frac{25 \times .001(50 - \text{mls. base}) \times 0.1 \times 100}{0.0823}$$

The results of these tests are summarized graphically in the accompanying drawing. The molar ratio $$\text{Et}_2\text{O/BuCl}$$

was calculated by dividing the moles of diethylether used in the particular run (0.708$x$/74.1) by 0.0823, the moles of butyl chloride taken.

In the drawing, Curve A represents the results obtained with magnesium chips cut by a slab milling operation using both climb-cutting and conventional cutting in an alternating sequence. The cutter speed was 1300 r.p.m., the feed rate was 5 inches per minute, the depth of cut was 0.003 inch. These chips, as well as all other slab milled chips, were wedge-shaped in cross section. A number of chips were measured with a micrometer at a point approximately midway along their length and the average of these measurements was taken. In this case, the method gave an average thickness of about 0.0016 inch.

The Curve B represents the results obtained with magnesium chips cut in an orthogonal turning operation using a cutter speed of 255 r.p.m., a depth of cut of 0.0024 inch, and having an actual thickness of approximately 0.0047 inch.

The Curve C represents the results obtained with commercial magnesium chips.

It will be seen from these curves that in each instance a minimum conversion occurs where the molar ratio of diethylether to butyl chloride is between 1 and 2. In the case of the special chips shown by Curves A and B, the minimum conversion is still greater than 60% whereas in the case of the commercial chips the minimum conversion is below 40%. The chips employed for the purpose of the invention, therefore, are defined empirically as plastically deformed magnesium chips having the thinness previously described and which, when used in making a Grignard reagent from butyl chloride and magnesium in a series of preparations in a predominantly hydrocarbon medium composed of heptane to which varying proportions of diethylether have been added, give conversions under reflux conditions to Grignard reagents that when plotted graphically with percent conversion as the ordinate and molar ratio of diethylether to butyl chloride as the abscissa show a minimum conversion where said molar ratio is between 1 and 2, which minimum is at least 60%.

In the procedure previously described butyl chloride Grignard reagent was prepared from magnesium chips in a hydrocarbon medium containing some diethylether. The same procedure was used in preparing various Grignard reagents from various types of magnesium chips in an exclusively hydrocarbon medium with conversions as shown in the following table (Table I). In carrying out these preparations, the quantity $x$ was zero. All reactions were carried out at the reflux temperature of the reaction mixture and the reaction temperatures are given in Table I. The following is a list of the reaction media used and their boiling points.

| Reaction media: | Boiling temperature, ° C. |
| --- | --- |
| Pentane | 36. |
| Hexane | 69. |
| Heptane | 98. |
| Decane | 174. |
| Stoddard Solvent [1] | 156–195. |
| Odorless Mineral Spirits [1] | 178–203. |
| Odorless 450 [1] | 209–231. |
| Triisobutylene | 125—reaction temperature. |
| Cyclohexane | 81. |
| Toluene | 110. |
| Xylene | 137–139. |
| Tetralin | 207. |
| Decalin | 185. |

[1] Commercial or trivial names for various distillation fractions of petroleum. They are complex mixtures of hydrocarbons, predominantly alkanes, but certain ones may contain appreciable amounts of olefinic, alicyclic, and even aromatic compounds.

The following is a list describing the magnesium chips used in carrying out the various preparations. In this list each chip is designated by a letter for convenience in identifying it in Table I.

| Code: | Description |
| --- | --- |
| A | Magnesium chips cut by a slab milling operation using both climb-cutting and conventional cutting in an alternating sequence. The cutter speed was 1300 r.p.m., the feed rate was 5 in./min., the depth of cut was 30×10⁻³ in. These chips, as well as all other slab milled chips, are wedge-shaped in cross section. A number of chips were measured with a micrometer and the average of these measurements was 0.0016 in. |
| B | Magnesium chips cut in an orthogonal turning operation using a cutter speed of 255 r.p.m., a depth of cut of 2.4×10⁻³ in., and having an actual thickness of approximately 4.7×10⁻³ in. |

| Code: | Description |
|---|---|
| D | Magnesium chips cut by a slab milling operation using both climb-cutting and conventional cutting in an alternating sequence. The cutter speed was 1300 r.p.m., the feed rate was 10 in./min., the depth of cut was 60×10⁻³ in. The average of a number of thickness measurements on these chips was 0.0022 inch. |
| E | Magnesium chips cut by a conventional slab milling operation using a cutter speed of 680 r.p.m., a feed rate of 22 in./min., and a depth of cut of 30×10⁻³ in. The average of a number of measurements on these chips was 0.0031 in. |
| F | Magnesium chips cut by an orthogonal turning operation using a spindle speed of 475 ft./min., a depth of cut of $0.41 \times 10^{-3}$ in., and which have an actual thickness of approximately $1.7 \times 10^{-3}$ in. |
| G | Magnesium chips cut by an orthogonal turning operation using a spindle speed of 475 ft./min., a depth of cut of $2.4 \times 10^{-3}$ in., and which have an actual thickness of approximately $4 \times 10^{-3}$ in. |
| H | Magnesium chips cut by a slab milling process operating in a climb-cutting fashion using a cutter speed of 1800 r.p.m., a feed rate of 11 in./min., and a depth of cut of $60 \times 10^{-3}$ in. The average of a number of thickness measurements was 0.0015 in. |
| J | Magnesium chips cut in an orthogonal turning operation using a spindle speed of 56 ft./min., a depth of cut of $0.42 \times 10^{-3}$ in., and which have an actual thickness of approximately $1.0 \times 10^{-3}$ in. |
| K | Magnesium chips cut by a conventional slab milling operation using a cutter speed of 1300 r.p.m., a feed rate of 0.3125 in./min., and a depth of cut of $300 \times 10^{-3}$ in. The average of a number of thickness measurements was 0.0007 in. |

TABLE I

*Experiments on the Preparation of Grignard Reagents in Exclusively Hydrocarbon Media*

| Preparation | Organic Halide | Medium | Chip | Temp., °C. | Percent Conversion |
|---|---|---|---|---|---|
| 1 | Ethyl Bromide | Heptane | H | 83 | 61.7 |
| 2 | Propyl Chloride | ____do____ | H | 85, 87 | 54.6 |
| 3 | Butyl Chloride | ____do____ | J | 94 | 70.0 |
| 4 | ____do____ | ____do____ | G | 93 | 39.4 |
| 5 | ____do____ | ____do____ | H | 92 | 62 |
| 6 | ____do____ | ____do____ | E | 93 | 59 |
| 7 | ____do____ | ____do____ | D | 94 | {61.9, 62.6} |
| 8 | ____do____ | ____do____ | A | 92 | 68.2 |
| 9 | ____do____ | ____do____ | K | 94, 94 | 68.1 |
| 10 | ____do____ | Triisobutylene | H | 137 | 64 |
| 11 | ____do____ | Cyclohexane | D | 78 | 60.3 |
| 12 | ____do____ | Stoddard Solvent | H | 158 | 63.6 |
| 13 | ____do____ | Odorless mineral Spirits | H | 183 | 34.4 |
| 14 | ____do____ | Toluene | A | 106 | 57.0 |
| 15 | ____do____ | Xylene | A | 132 | 71.0 |
| 16 | Butyl Bromide | Heptane | H | 95 | 62.6 |
| 17 | ____do____ | ____do____ | D | 96 | 69.1 |
| 18 | Butyl Iodide | ____do____ | D | 94 | 69.7 |
| 19 | ____do____ | ____do____ | H | 96 | 75.3 |
| 20 | Pentyl Chloride | ____do____ | H | 98 | 58.2 |
| 21 | Hexyl Chloride | ____do____ | H | 98 | 60.7 |
| 22 | Heptyl Chloride | ____do____ | H | 101 | 50.8 |
| 23 | Octyl Chloride | ____do____ | D | 101 | 47 |
| 24 | Nonyl Chloride | ____do____ | A | 99 | 43.5 |
| 25 | Dodecyl Chloride | Stoddard Solvent | D | 167 | 39.2 |
| 26 | Dodecyl Bromide | ____do____ | H | 165 | 57.0 |
| 27 | Hexadecyl Chloride | ____do____ | A | 164 | 53.6 |
| 28 | 3-Phenylpropyl Chloride | ____do____ | D | 163 | 29.1 |
| 29 | Phenyl Chloride | Heptane | H | 100, 105 | 31.3 |
| 30 | ____do____ | Decane | A | 168 | 77.6 |
| 31 | ____do____ | ____do____ | F | 166 | 77.7 |
| 32 | ____do____ | Stoddard Solvent | H | 159 | 75.1 |
| 33 | ____do____ | Heptane (25%) + Stoddard Solvent (75%) | H | 134 | 59.3 |
| 34 | ____do____ | Heptane (13%) + Stoddard Solvent (87%) | H | 145 | 73.3 |
| 35 | ____do____ | Odorless Mineral Spirits | H | 178 | 78.1 |
| 36 | ____do____ | ____do____ | A | 170 | 79.2 |
| 37 | ____do____ | Odorless 450 | H | 190 | 76.9 |
| 38 | ____do____ | Toluene | A | 109 | 68.2 |
| 39 | ____do____ | Tetralin | A | 195 | 71.7 |
| 40 | ____do____ | Decalin | D | 182 | 79.6 |
| 41 | Phenyl Bromide | Heptane | H | 101 | 62.6 |
| 42 | ____do____ | Stoddard Solvent | H | 161 | 78.8 |
| 43 | Phenyl Iodide | Heptane | H | 102 | 67.8 |
| 44 | ____do____ | Stoddard Solvent | H | 166 | 74.2 |
| 45 | 4-Chloro Toluene | ____do____ | H | 162 | 42.2 |
| 46 | 1-Chloronaphthalene | ____do____ | H | 172 | 70.8 |
| 47 | 1-Bromonaphthalene | ____do____ | H | 165 | 51.0 |
| 48 | Butyl Chloride | Pentane-hexane | A | 52 | 23.7 |
| 49 | Ethyl Bromide | Pentane | A | 36 | 9.6 |

It will be seen from the foregoing table that the use of an exclusively hydrocarbon reaction medium is especially suitable for preparing Grignard reagents from primary organic halides where the halogenated atom is either a chlorine, bromine, or iodine atom. The reaction proceeds smoothly in hydrocarbon solvents except benzene.

In practicing the invention the hydrocarbon media used can be saturated or unsaturated aliphatic and alicyclic hydrocarbons, alkyl-aryl hydrocarbons, alkenyl-aryl hydrocarbons, alkynylaryl hydrocarbons, and unsubstituted higher molecular weight aromatic hydrocarbons. Suitable hydrocarbon media are tetrahydronaphthalene, decahydronaphthalene, toluene, xylene, cyclohexane, triisobutylene, hexane, heptane, decane, and mixtures of two or more such hydrocarbons. The hydrocarbons which have been found to be effective lack active hydrogen atoms. Benzene can be used in some instances if a large excess of magnesium is employed where the reaction medium is composed exclusively of this hydrocarbon.

In the practice of the invention it has not been found feasible to prepare Grignard reagents from secondary and tertiary alkyl chlorides or bromides, nor from olefinically or acetylenically unsaturated halides, nor from methyl chloride, ethyl chloride, methyl bromide, benzyl chloride, or 2-phenylethyl chloride, in an exclusively hydrocarbon medium. By the addition of certain substances in minor proportions as compared with the hydrocarbon medium, it is possible to carry out reactions with many compounds that cannot be prepared satisfactorily in an exclusively hydrocarbon medium.

The following table (Table II) illustrates a number of preparations in which satisfactory results were obtained by the practice of the invention with a predominantly hydrocarbon medium containing a minor proportion of an additive. The procedure used in carrying out the reactions was the same as that previously described in connection with the prepartion of the butyl magnesium chloride except that in some cases different starting materials were used and different proportions of the additive were employed.

In Table II the figures given in parentheses beneath the name of the additive are the molar ratios of the additive to the organic halide. In the preparations which employ additives other than diethylether appropriate alterations for density and molecular weight in the expression "0.708x/74.1 mole" must be made.

The chemical structural formulae of the various materials designated as polyethers in Table II are as follows:

Polyether A=$CH_3OCH_2CH_2OCH_3$
Polyether B=$CH_3OCH_2CH_2OCH_2CH_2OCH_3$
Polyether C=$CH_3O(CH_2CH_2O)_3CH_3$
Polyether E=$(CH_3CH_2OCH_2CH_2)_2O$
Polyether F=$C_4H_9OCH_2CH_2OC_4H_9$

TABLE II

| Preparation | Organic Halide | Medium | Additive and (Mole Equivalent) | Chip | Temp., °C. | Percent Conversion |
|---|---|---|---|---|---|---|
| 1 | Isopropyl Chloride | Heptane | Diethyl Ether (1.0) | D | 94 | 83.6 |
| 2 | Butyl Chloride | do | Tetrahydrofuran (1.0) | D | 92 | 65.2 |
| 3 | do | do | Dimethylaniline (1.0) | D | 97 | 74.5 |
| 4 | do | do | Dimethylaniline (0.25) | D | 95 | 74.0 |
| 5 | do | do | Dimethylaniline (0.10) | D | 94 | 74.2 |
| 6 | do | do | Dibutylether (1.0) | A | 95 | 70.0 |
| 7 | do | do | Polyether A (0.25) | A | 94 | 62.8 |
| 8 | do | do | Polyether A (0.50) | A | 94 | 49.5 |
| 9 | do | do | Polyether A (1.0) | A | 92 | 74.7 |
| 10 | do | do | Anisole (1.0) | A | 96 | 69.3 |
| 11 | do | do | Polyether E (1.0) | D | 95 | 83.7 |
| 12 | do | do | Polyether B (1.0) | A | 96 | 82.1 |
| 13 | Ethyl Bromide | Pentane | Diethylether (1.0) | A | 35 | 86.3 |
| 14 | Butyl Chloride | Heptane | Polyether C (1.0) | A | 96 | 80.3 |
| 15 | s-Butyl Chloride | do | Diethylether (1.0) | D | 85 | 81.2 |
| 16 | do | do | Diethylether (0.25) | D | 87 | 43.4 |
| 17 | do | do | Diethylether (0.50) | D | 90 | 68.3 |
| 18 | do | do | Diethylether (0.20) | A | 93 | 37.0 |
| 19 | do | do | Diethylether (1.5) | A | 79 | 83.9 |
| 20 | do | do | Dimethylaniline (1.0) | D | 93 | 57.8 |
| 21 | t-Butyl Chloride | do | Diethylether (1.0) | D | 35 | 45.8 |
| 22** | do | do | Diethylether (1.0) | D | 86, 85 | 76.9 / 78.2 |
| 23** | do | do | Diethylether (0.5) | A | 89 | 37.5 |
| 24** | do | do | Diethylether (1.2) | A | 84 | 78.9 |
| 25 | Isobutyl Chloride | do | Diethylether (1.0) | D | 91 | 88.8 |
| 26 | do | do | Diethylether (1.0) | D | 90 | 89.2 |
| 27 | 2-Pentyl Chloride | do | Diethylether (1.0) | D | 91 | 81.5 |
| 28 | 3-Pentyl Chloride | do | Diethylether (1.0) | D | 92 | 86.4 |
| 29** | t-Pentyl Chloride | do | Diethylether (1.0) | D | 91 | 61.4 |
| 30 | Cyclopentyl Chloride | do | Diethylether (1.0) | D | 85 | 75.0 |
| 31 | Cyclopentyl Bromide | do | Dipropylether (0.44) | D | 91 | 34.5 |
| 32 | Cyclohexyl Chloride | do | Diethylether (1.0) | D | 91 | 84.1 |
| 33 | Cyclohexyl Bromide | do | Dipropylether (0.44) | D | 97 | 36.8 |
| 34 | Dodecyl Chloride | do | Diethylether (1.0) | A | 88 | 74.3 |
| 35 | Hexadecyl Chloride | do | Diethylether (1.0) | A | 89 | 41.2 |
| 36** | Allyl Chloride | Pentane | Diethylether (4.0) | A | 35 | 51.6 |
| 37** | do | Benzene | Diethylether (4.0) | A |  | 48.8 |
| 38** | do | Pentane | Tetrahydrofuran (4.0) | A | 50 | 73.4 |
| 39** | Benzyl Chloride | do | Diethylether (1.0) | D | 35 | 30.0 |
| 40** | do | do | Diethylether (1.0) | F | 36 | 40.0 |
| 41** | do | Toluene | Tetrahydrofuran (1.0) | D | 105 | 32.4 |
| 42** | do | do | Diethylether (1.0) | D | 96 | 34.9 |

TABLE II—Continued

| Preparation | Organic Halide | Medium | Additive and (Mole Equivalent) | Chip | Temp., °C. | Percent Conversion |
|---|---|---|---|---|---|---|
| 43 | Benzyl Chloride | Pentane | Diethylether (1.0) | D | 36 | 35.6 |
| 44 | Phenyl Chloride | Stoddard Solvent | Tetrahydrofuran (1.0) | A | 145 | 74.1 |
| 45 | ___do___ | ___do___ | Anisole (1.0) | A | 155 | 66.8 |
| 46 | ___do___ | ___do___ | Anisole (0.5) | A | 157 | 76.1 |
| 47 | ___do___ | ___do___ | Anisole (2.0) | A | 153 | 74.4 |
| 48 | (DiGrignard) 1,4-Dichloro-benzene. | ___do___ | Tetrahydrofuran (2.0) | A | 130 | 26.9 |

In the preparations summarized in Tables I and II, except those preparations marked by  all reactants were combined initially and the mixture then brought to the reaction temperature. In the preparations marked with the  all of the reactants except the organic halide were combined and the mixture then brought to reflux and treated over the course of an extended period of time (2 hours) with the dropwise or portionwise addition of the organic halide.

The manner in which the reactants are combined may or may not have an effect upon the conversions obtained. For example, the phenyl chloride Grignard reagent was prepared using magnesium chips D in Stoddard solvent both in the batchwise procedure and in a slight modification of that procedure wherein the total amount of phenyl chloride was divided into five equal portions added at timed intervals over the course of five hours (Portion No. 1 added at $t=0$ hr., Portion No. 2 added at $t=2$ hr., and Portions No. 3, 4 and 5 added at $t=3$, 4 and 5 hr., respectively). In this preparation only 70 ml. rather than the standard 110 ml. of hydrocarbon medium (Stoddard solvent) was present in the reaction vessel at the beginning of the reaction. The remaining 40 ml. of diluent was combined with the phenyl chloride. The percent conversions to Grignard reagent with these two procedures were essentially the same, namely, 75.5% and 75.8%.

A similar pair of preparations was made using butyl chloride and magnesium chips of the B type in heptane medium, the butyl chloride being added in six equal portions at intervals of 45 minutes. In the batchwise procedure the conversion was 39.4% whereas in the portionwise addition of the butyl chloride the conversion was 59.3%.

In another pair of preparations using butyl chloride and heptane but employing magnesium chips of the F type, the conversion with the batchwise procedure was 70.3% and with the portionwise addition the conversion was 76.6%.

In another type of preparation all of the reactants except the magnesium chips were present initially and the mixture was brought to reflux temperature. The magnesium chips (F type) were then added in small portions every two minutes over the course of two hours. The conversion to Grignard reagent was 50.6% whereas by following a batchwise procedure the same reactants furnished a 70.0% conversion.

The stirring speed is also a factor in the conversions obtained. As an example a set of preparations was carried out to determine the effect of different stirring speeds upon the percent conversion to Grignard reagent using phenyl chloride in Stoddard solvent with the H type chip. At a stirring speed of 237 r.p.m. the conversion was 68% whereas at 757 r.p.m. the conversion rose to 80.7%.

Although the extent of conversion to Grignard reagent is affected by the ratio of hydrocarbon diluent to organic halide taken, particularly when that ratio is small, this effect is but minor in that range deemed suitable for the practice of this invention, viz., from about 3 volumes of hydrocarbon medium per volume of organic halide to 16 volumes of hydrocarbon medium per volume of organic halide.

The relative volume ratio of hydrocarbon medium and reactants is preferably within the range of 3:1 to 10:1.

In the examples given, the magnesium chips and organic halide were allowed to react with proportions of one gram atom of magnesium chips to one mole of organic halide but it was possible to carry out the reaction with either an excess of magnesium or an excess of the organic halide, and the conversions obtained were affected by the relative proportions. Thus, magnesium chips having a thickness of 0.004" when allowed to react in n-heptane with n-butyl chloride taken in equimolar amount, furnished a 39% conversion to Grignard reagents. However, when the same amount of n-butyl chloride in n-heptane was allowed to react with four times as much of these same chips, the conversion rose to 69%. This latter conversion was essentially the same as that furnished by chips having one-fourth that thickness (0.001") in reaction with an equimolar amount of butyl chloride in heptane. Furthermore, when the magnesium which remained unreacted at the close of the preparation employing the four equivalents of magnesium per equivalent of butyl chloride, was recovered and employed in a second run using the same amount of butyl chloride-heptane solution as in the first run, a 67% conversion was obtained.

In another series of preparations, fixed amounts of magnesium in Stoddard solvent were allowed to react with increasing amounts of phenyl chloride to determine just how excess organic halide affects the percent conversion to Grignard reagents. In five preparations equimolar amounts of the two reactants were used as compared with 25%, 50%, 100% and 200% excesses of the phenyl chloride. In the preparation using the equimolar amounts a 76% conversion was obtained. Maximum conversion of 87.5% was obtained when about 100% excess of phenyl chloride was used. A 200% excess of phenyl chloride resulted in an 85% conversion.

The following table (Table III) gives the results of preparations of various Grignard reagents with magnesium chips of different thicknesses, using various types of solvents and various starting materials. These preparations were carried out in the manner previously described employing chemically equivalent quantities of the organic chloride used as a starting material and the magnesium chips. In each instance, the solvent used consisted of $x$ mls. of diethylether ($Et_2O$), tetrahydrofuran (THF), or triethylamine ($Et_3N$) in $110-x$ mls. of heptane. Otherwise, the reaction conditions were similar to those previously described. The percent conversion in each type of solvent mixture is given at the righthand side of the table and the results show that the lowest conversions were obtained with the chips having a thickness greater than 0.0075". The designation "M.E." is used to indicate mole equivalents of additive solvent present in the heptane medium. Where a percentage figure is given under the additive concentration, the percentage is by volume and represents the following in terms of mole equivalents of additive to the heptane medium:

45% THF = 7.35 mole equivalents
45% Et$_2$O = 5.78 mole equivalents
45% Et$_3$N = 4.34 mole equivalents

TABLE III

| Name | Formula | Chip Thickness, in. | Additive Concen. | Percent Conversion to Grignard | | |
|---|---|---|---|---|---|---|
| | | | | Et$_2$O | THF | Et$_3$N |
| Butyl Chloride | CH$_3$CH$_2$CH$_2$CH$_2$Cl | 0.001 | 0.5 M.E. | 90 | | |
| | | 0.001 | 1.0 M.E. | 90 | | |
| | | 0.005 | 1.0 M.E. | 80 | | |
| | | 0.005 | 45% | 91.0 | 94.0 | |
| | | 0.0075 | 1.0 M.E. | 60.4 | 14.7 | 74.5 |
| | | 0.0075 | 45% | 96.1 | 94.0 | |
| | | 0.015 | 1.0 M.E. | 53.5 | 9.0 | 73.3 |
| | | 0.015 | 45% | 83.9 | 87.0 | |
| Isobutyl Chloride | (CH$_3$)$_2$CHCH$_2$Cl | 0.001 | 1.0 M.E. | 88.8 | | |
| | | 0.0075 | 1.0 M.E. | 71.9 | 9.6 | 59.7 |
| | | 0.0075 | 45% | 89.1 | 90.2 | |
| | | 0.015 | 1.0 M.E. | 59.8 | 5.9 | 68.9 |
| | | 0.015 | 45% | 77.7 | 69.0 | |
| Cyclohexyl Chloride | CH$_2$(CH$_2$)$_4$CHCl | 0.001 | 1.0 M.E. | 85.0 | | |
| | | 0.0075 | 1.0 M.E. | 71.0 | 77.3 | |
| | | 0.0075 | 45% | 92.6 | | |
| | | 0.015 | 1.0 M.E. | 50.3 | 61.0 | |
| | | 0.015 | 45% | 81.0 | | |

The examples given in Table III are intended to be illustrative only and are not intended to be indicative of the results that would be obtained with other starting materials. The Grignard reaction is highly specific with the percent conversion depending upon the particular organic halide and the particular solvent employed in carrying out the reaction. It has been found that best results in a predominantly hydrocarbon medium are obtained by use of chips having a thickness of 0.0001 to 0.0075". In an exclusively hydrocarbon medium, the range of chip thickness is between 0.0001 to 0.005".

One of the important characteristics of the magnesium chips provided in accordance with the present invention is that they can be compacted at low orders of pressures into pellets or briquettes which will remain in compacted form for storage and handling but are readily capable of disintegrating and reacting with an organic halide in a liquid reaction medium to form a Grignard reagent. Commercial magnesium chips having an average thickness of 0.015" require high compression pressures to compact them into pellets that will not disintegrate in normal storage and handling and when pressures are used which are high enough to compact such chips to a pellet which will not disintegrate they are too compact to disintegrate in the presence of a solvent in Grignard reactions. For example, magnesium chips were compressed in a four inch diameter mold using a press which could measure accurately to 50 pounds per square inch (p.s.i.) the pressures necessary to achieve a desired thickness. It was observed that 96 grams of a commercial magnesium chip having an average thickness of 0.015" when pressed to a thickness of 0.500" at a compression pressure of 3500 p.s.i. gave a pellet which had a bulk factor of 1.97 and which was unstable to the extent that it fell apart on touching it. The term "bulk factor" refers to the volume of the compressed chip pellet relative to the volume of bulk metal before forming it into chips. When the same amounts of commercial chips were pressed to a pellet thickness of 0.400" with a compression pressure of 4800 p.s.i. to give a pellet having a bulk factor of 1.60, the pellet was too compact to disintegrate in the Grignard reaction.

On the other hand, when magnesium chips provided in accordance with the present invention were compacted at pressures in the range of 50 to 1500 p.s.i. to pellets having a bulk factor between 2.00 and 4.75 the resultant pellets were capable of withstanding ordinary handling and storage and were suitable for carrying out the Grignard reactions.

The process as described can be carried out under atmospheric, sub-atmospheric or super-atmospheric pressure conditions but is preferably carried out under reflux at atmospheric pressures.

While the invention is preferably employed in the preparation of Grignard reagents in a predominantly hydrocarbon solvent, the special magnesium chips can also be used to prepare Grignard reagents where an excess of the organic halide serves as the solvent. For example, in making phenyl magnesium chloride the phenyl chloride when used in an excess of 500% served as a reaction medium and a high conversion was obtained.

Throughout the specification and claims it will be understood that the term "organic halide" refers to organic compounds of the type herein described which may be either chlorides, bromides or iodides.

The invention is hereby claimed as follows:

1. A process of preparing Grignard reagents which comprises reacting an organic halide in a predominantly hydrocarbon medium with a special magnesium chip which has been plastically deformed by a mechanical cutting operation to an average thickness within the range of 0.0001" to 0.0075".

2. A process of preparing Grignard reagents which comprises reacting an organic halide in an exclusively hydrocarbon medium with a special magnesium chip which has been plastically deformed by a mechanical cutting operation to an average thickness within the range of 0.0001" to 0.005".

3. A process of preparing Grignard reagents which comprises reacting a primary alkyl halide with a special magnesium chip which has been plastically deformed by a mechanical cutting operation to an average thickness within the range of 0.0001" to 0.0075", in a predominantly hydrocarbon reaction medium.

4. A process of preparing Grignard reagents which comprises reacting a primary alkyl halide with a special magnesium chip which has been plastically deformed by a mechanical cutting operation to an average thickness within the range of 0.0001" to 0.005", in an exclusively hydrocarbon reaction medium.

5. A process of preparing Grignard reagents which comprises reacting a secondary alkyl halide with a special magnesium chip which has been plastically deformed by a mechanical cutting operation to an average thickness within the range of 0.0001" to 0.0075", in a predominantly hydrocarbon medium.

6. A process of preparing Grignard reagents which comprises reacting a tertiary alkyl halide with a special magnesium chip which has been plastically deformed by a mechanical cutting operation to an average thickness within the range of 0.0001″ to 0.0075″, in a predominantly hydrocarbon medium.

7. A process of preparing Grignard reagents which comprises reacting an alicyclic halide with a special magnesium chip which has been plastically deformed by a mechanical cutting operation to an average thickness within the range of 0.0001″ to 0.0075″, in a predominantly hydrocarbon medium.

8. A process of preparing Grignard reagents which comprises reacting an aryl halide with a special magnesium chip which has been plastically deformed by a mechanical cutting operation to an average thickness within the range of 0.0001″ to 0.0075″, in a predominantly hydrocarbon medium.

9. A process of preparing Grignard reagents, which comprises reacting an aryl halide with a special magnesium chip, which has been plastically deformed by a mechanical cutting operation to an average thickness within the range of 0.0001″ to 0.005″, in an exclusively hydrocarbon medium.

10. A compacted pellet composed of special magnesium chips which have been plastically deformed by a mechanical cutting operation to an average thickness within the range of 0.0001″ to 0.0075″, which can be handled and stored without disintegration and which will disintegrate with an organic halide in a solvent medium in a Grignard reaction, said pellet having a bulk factor within the range of 2.00 to 4.75.

References Cited in the file of this patent
UNITED STATES PATENTS

| | | |
|---|---|---|
| 2,416,717 | Shaw | Mar. 4, 1947 |
| 2,680,758 | Cunningham | June 8, 1954 |
| 2,795,626 | Nobis | June 11, 1957 |
| 2,795,628 | Ramsden | June 11, 1957 |
| 2,952,596 | Rylander | Sept. 13, 1960 |

OTHER REFERENCES

Karasch et al.: "Grignard Reactions of Metallic Substances," Prentice-Hall, N.Y., 1954, pages 6–8, 50–53.

UNITED STATES PATENT OFFICE
CERTIFICATE OF CORRECTION

Patent No. 3,140,321                         July 7, 1964

George J. Goepfert et al.

It is hereby certified that error appears in the above numbered patent requiring correction and that the said Letters Patent should read as corrected below.

Column 2, line 67, for "objects" read -- object --; column 7, TABLE II, under the heading "Organic Halide" opposite "Preparation 26", for "do" read -- Isopentyl Chloride --.

Signed and sealed this 17th day of November 1964.

SEAL)
Attest:

ERNEST W. SWIDER                         EDWARD J. BRENNER
Attesting Officer                           Commissioner of Patents